No. 756,022. PATENTED MAR. 29, 1904.
C. H. JENKINS.
MANUFACTURE OF CAST GLASS PIPES.
APPLICATION FILED MAR. 5, 1903.
NO MODEL.

WITNESSES:
George D. Hall
E. Batchelder

INVENTOR:
C. H. Jenkins
By Wright Brown & Quinby
Attys

No. 756,022. Patented March 29, 1904.

UNITED STATES PATENT OFFICE.

CHARLES H. JENKINS, OF SOMERVILLE, MASSACHUSETTS, ASSIGNOR TO CHARLES D. JENKINS, OF WINCHESTER, MASSACHUSETTS.

MANUFACTURE OF CAST GLASS PIPES.

SPECIFICATION forming part of Letters Patent No. 756,022, dated March 29, 1904.

Application filed March 5, 1903. Serial No. 146,258. (No model.)

*To all whom it may concern:*

Be it known that I, CHARLES H. JENKINS, of Somerville, in the county of Middlesex and State of Massachusetts, have invented certain new and useful Improvements in the Manufacture of Cast Glass Pipes, of which the following is a specification.

Many attempts have been made to utilize cast glass pipes for electrical, water, and other conduits and also for various other purposes; but hitherto they have all proved failures by reason of the unsatisfactory construction of the joints or union.

My invention is to produce cast glass pipes for various purposes with screw-threaded ends, the screw-threads of which will be perfect and fit one another so as to form a perfectly tight joint.

The invention consists in the process substantially as hereinafter fully described and pointed out in the claim.

Figure 1:
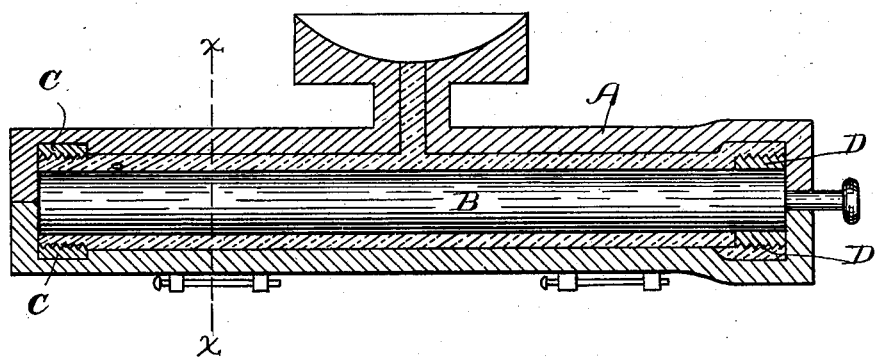
Figure 2:
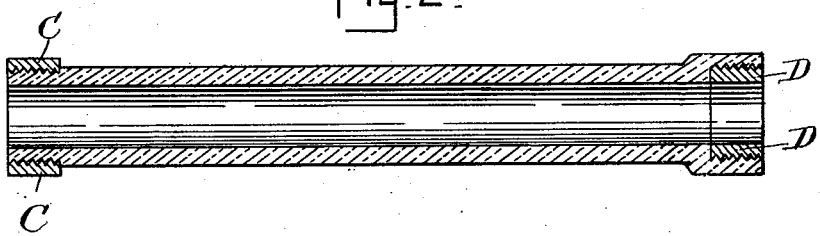
Figure 3:
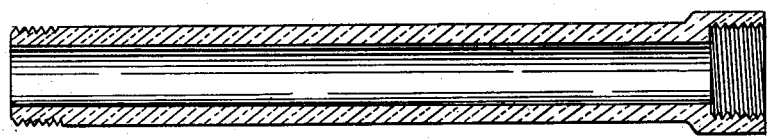
Figure 4:
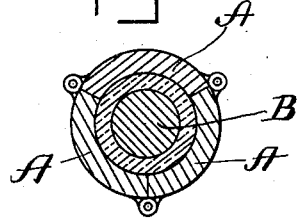

Referring to the accompanying drawings, Figure 1 represents a vertical longitudinal section of a mold having a glass pipe cast therein, the mold and arbor being fitted with shells for producing screw-threads according to my invention. Fig. 2 shows a longitudinal section of a cast glass pipe after it has been removed from the mold and having the shells adhering thereto. Fig. 3 is a longitudinal section of a cast glass pipe after the mold and shells have been removed. Fig. 4 is a transverse section taken on line $x\ x$ of Fig. 1.

A represents the mold, which is made in three parts hinged together in the ordinary manner; B, the arbor or core; C, the shell for forming the male screw on one end of the pipe. This consists of a shell of metal screw-threaded on its inner surface, the thread being of a size equal to the diameter of the pipe. This shell fits into a recess formed in that end of the mold.

D is the shell for forming the female thread in the socket of the pipe and is placed upon the arbor or core B. The glass is then run in in the usual manner, and when cooled the mold is removed and the glass annealed, the shells being left thereon so that the threads on the pipe will not be distorted, but fit perfectly. After the pipe is properly annealed the shells C D are removed to be used over again.

It will be seen that by this arrangement pipes of any diameter can be formed with screw-threads on their ends, and, if desired, both ends may be formed with a male screw and the pipes connected together by a coupling-piece formed with a female screw-thread.

I claim—

The process of making glass pipes with screw-threaded ends adapted to fit one another, said process consisting in casting the glass upon an externally-threaded shell at one end and within an internally-threaded shell at the other end, annealing the glass while the shells are in place at said ends, and subsequently unscrewing said shells, as set forth.

In testimony whereof I have affixed my signature in presence of two witnesses.

CHARLES H. JENKINS.

Witnesses:
C. F. BROWN,
E. BATCHELDER.